(No Model.)
C. T. HURD.
MEAT BROILER.
No. 267,535.
Patented Nov. 14, 1882.
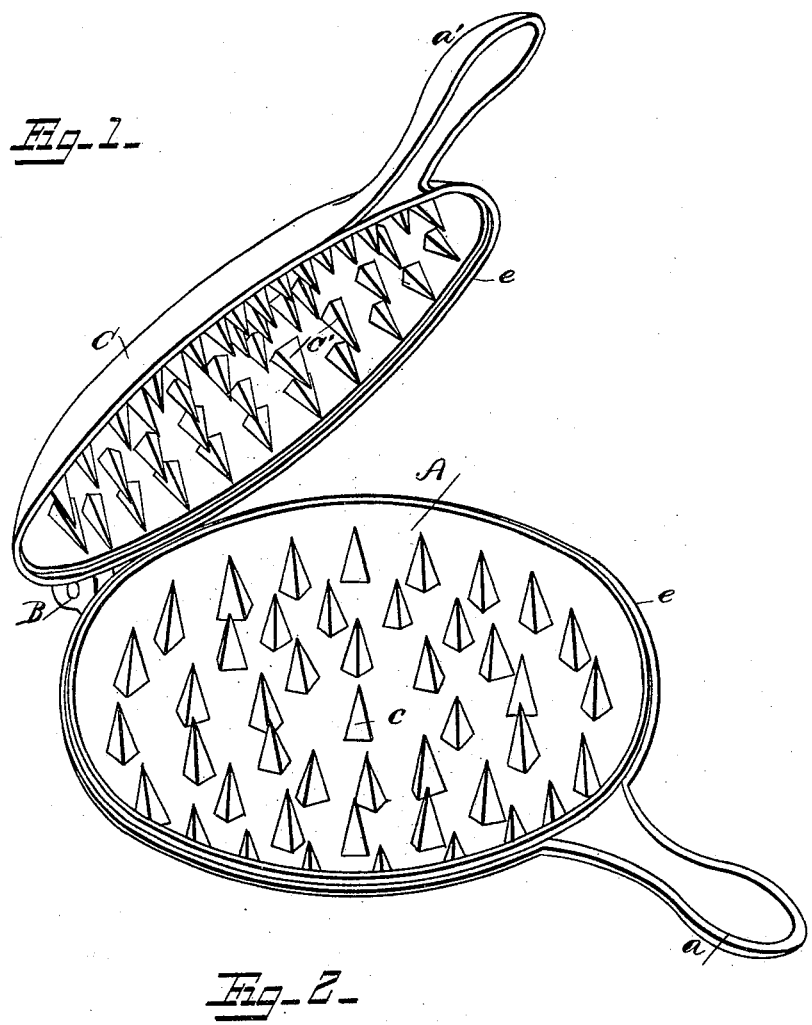
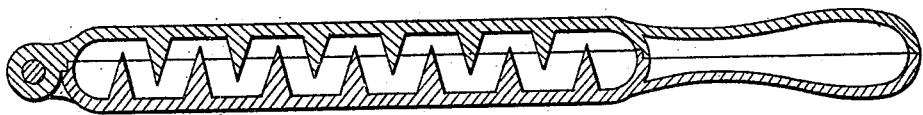
Witnesses-
F. L. Durand,
E. H. Bradford
Inventor-
Chas. T. Hurd
By H. J. Ennis
Atty.

UNITED STATES PATENT OFFICE.

CHARLES T. HURD, OF PEORIA, ILLINOIS.

MEAT-BROILER.

SPECIFICATION forming part of Letters Patent No. 267,535, dated November 14, 1882.

Application filed September 11, 1882. (No model.)

*To all whom it may concern:*

Be it known that I, CHARLES T. HURD, a citizen of the United States of America, residing at Peoria, in the county of Peoria and State of Illinois, have invented certain new and useful Improvements in Meat-Broilers or Gridirons, of which the following is a specification, reference being had therein to the accompanying drawings.

My invention has relation to devices for destroying "trichina" in meats of all kinds during the process of cooking; and the object of the invention is to so construct a cooking utensil for this purpose that it will thoroughly exterminate all animal life in the meat and render it safe and healthy for food; and to that end the invention consists in the construction of the same as will be hereinafter more fully described, and particularly pointed out in the claim.

Figure 1 is a perspective view of my improved cooking utensil as it appears when ready to receive the meat, and Fig. 2 is a longitudinal section through the hinge and handle.

A is a cast-iron dish, having a handle, *a*, and hinge B, and an inner surface provided with a series of pyramidal teeth, *c*. C is a similar dish, and is the exact counterpart of A, except that the teeth *c'* are so interspersed as to come in between the teeth *c*. The two dishes A C are hinged together, as shown, and the rims of both are provided with a rabbet, *e*, which makes an air-tight joint, so as to retain and confine the heat and juices of the meat in the space between them.

In operation, a piece of meat is placed between the dishes and the handles *a a'* are pressed together. This forces the teeth into and through the meat, and when the device is placed on the fire or stove it is reversed from time to time, so as to thoroughly cook both sides of the meat, while the teeth convey the heat to the interior of the meat, which thus thoroughly and rapidly cooks it. Should there be any animal life—such as trichina or the like—in the meat, it will be destroyed, and at the same time the natural juices of the meat being retained will render it tender and palatable.

I am aware that devices of this kind having teeth, as shown in the United States Patent No. 37,460, are old, and such I do not desire to broadly claim.

Having thus fully described my invention, what I claim as new and useful, and desire to secure by Letters Patent of the United States, is—

A cooking or broiling device consisting of the hinged dishes A C, having handles *a a'*, and pyramidal teeth on the one half projecting between the teeth on the other half, and provided with an air-tight joint, *e*, as set forth.

In testimony whereof I affix my signature in presence of two witnesses.

CHARLES T. HURD.

Witnesses:
 J. A. McCOY,
 W. L. HENDRICKS.